United States Patent [19]

Wright et al.

[11] 4,392,745
[45] Jul. 12, 1983

[54] TILT HEAD CAMERA FOR INTERFEROMETRIC ANALYSIS OF TIRES

[75] Inventors: Forrest S. Wright; Ted R. Zimmerman, both of Rochester, Mich.

[73] Assignee: Industrial Holographics, Inc., Auburn Heights, Mich.

[21] Appl. No.: 251,403

[22] Filed: Apr. 6, 1981

[51] Int. Cl.³ .............................................. G01B 9/25
[52] U.S. Cl. ..................................... 356/348; 350/3.6
[58] Field of Search ................. 356/347, 348; 350/3.6, 350/3.79

[56] References Cited

U.S. PATENT DOCUMENTS

| | | | |
|---|---|---|---|
| 3,644,047 | 2/1972 | Brown et al. | 350/3.6 |
| 3,883,215 | 5/1975 | Kurtz | 356/347 |
| 3,934,461 | 1/1976 | Heflinger et al. | 356/347 |
| 4,139,302 | 2/1979 | Hung et al. | 356/358 |
| 4,225,237 | 9/1980 | Rottenkolber | 356/348 |
| 4,225,238 | 9/1980 | Rottenkolber | 356/348 |
| 4,234,256 | 11/1980 | Yeager | 356/348 |

*Primary Examiner*—Bruce Y. Arnold
*Attorney, Agent, or Firm*—Krass, Young & Schivley

[57] ABSTRACT

An adjustable camera is operative to perform interferometric analysis of areas on the surface of an object such as a vehicle tire using light from a coherent source. The camera mechanism includes vertical guides projecting upwardly from a support moveable in the horizontal plane along the base. A slide is adjustable vertically along the guides and carries a camera housing that is adjustable relative to the slide about a horizontal pivot axis. A coherent light source is fixed relative to the base and projects its beam parallel to the adjustment of the guide support. An optical element on the guide support projects the beam upwardly parallel to the guides to a mirror which reflects the beam horizontally about the pivot axis of the housing. A beam splitter divides the beams into an object beam and a reference beam. The object beam is projected out of the housing to illuminate a surface of the tire and cause light to be reflected to a film section supported in the housing. The camera housing may be moved horizontally and vertically and tilted to various angles to analyze various sections of the tire, without impairing the required positional relationship to the coherent light source.

8 Claims, 6 Drawing Figures

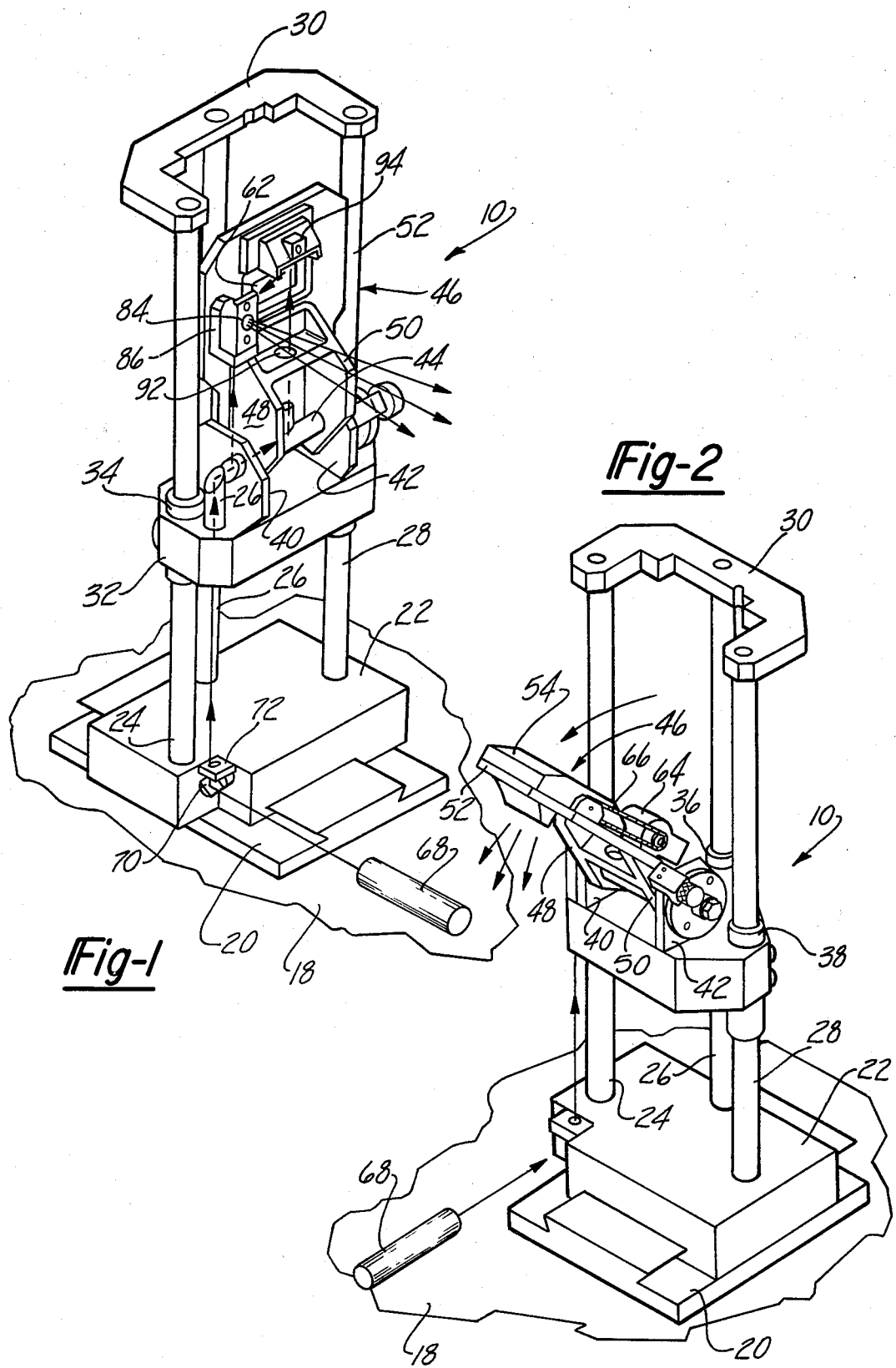

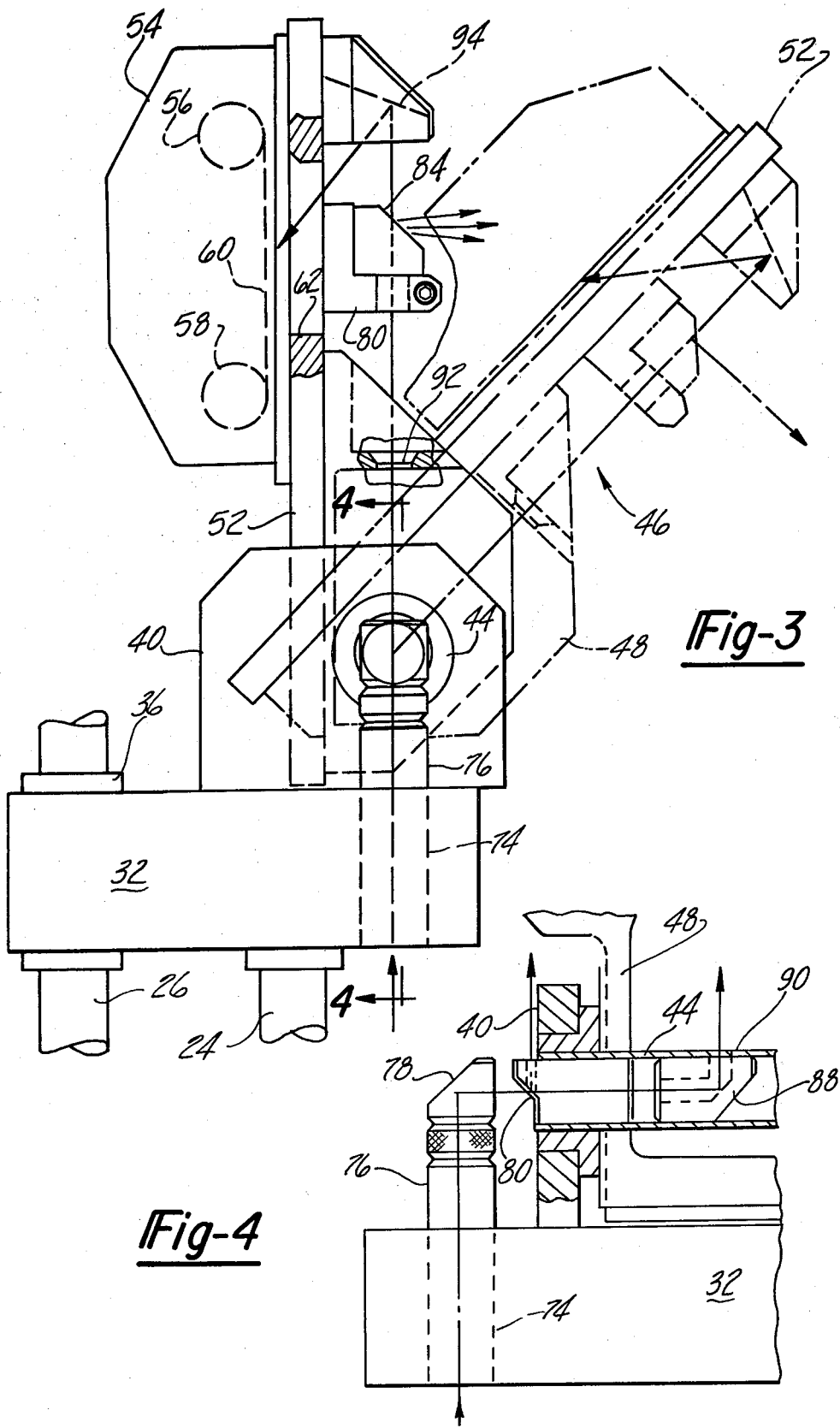

TILT HEAD CAMERA FOR INTERFEROMETRIC ANALYSIS OF TIRES

BACKGROUND OF THE INVENTION

1. Field of the Invention

This invention relates to an adjustable camera for performing coherent interferometric analysis of object surfaces and more particularly to apparatus for analyzing a variety of surfaces of vehicle tires.

2. Prior Art

The development of the laser as a convenient source of light that is both temporally and spatially coherent has given rise to a class of interferometric techniques for non-destructively testing objects by interferometrically comparing their surfaces before and after the application of a mechanical or thermal stress. For example, subsurface anomalies in rubber vehicle tires may be detected by placing the tires in a pressure chamber and making an interferometric comparison of their surface contours before and after a pressure change. Subsurface separations resulting from improper processing of the tire or impacts experienced during its use will result in non-uniform deformation of the tire surface as a result of the pressure change.

Any of several interferometric techniques may be employed to compare a surface section before and after the pressure change to detect deformation anomalies indicative of subsurface defects. For example, British Patent No. 1,261,542 discloses a method of holographic interferometric analysis of tire defects wherein a double exposure hologram of the tire section formed by making exposures before and after the pressure change may be illuminated to reconstruct an image of the tire section containing interference fringes mapping the surface deformation resulting from the pressure change. Each hologram of the double exposure is made by illuminating photographic film with an "object beam" of coherent light reflected from the tire section and a "reference beam" of light derived from the same coherent light source as the object illuminating beam. This method of deformation analysis has gained wide-spread acceptance for inspection of automotive and aircraft tires.

Alternative interferometric inspection techniques employing double exposures of coherently illuminated surfaces may also be employed for non-destructive testing. U.S. Pat. No. 4,139,302 discloses a double exposure surface analysis method which does not require a separate reference beam but rather passes light from a coherently illuminated surface through a special lens which focuses reflected light into two overlapping and interfering images. This technique has been commercialized under the mark "SHEAROGRAPHY" and substantially relieves the stability requirements associated with holography and accordingly substantially simplifies the analysis mechanism.

The size of the area that can be analyzed by these systems is limited by the power of the laser used and the geometry of the object being analyzed. In systems used to inspect tires it is necessary to take several exposures around the perimeter of the tire. Typically the tire is supported on a horizontal surface, with its central axis vertical, and the interferometric camera is supported centrally within the tire. The tire is rotated relative to the camera between exposures so that successive sectors of the interior of the tire may be analyzed. These cameras are accordingly primarily employed for inspecting the interior crown of the tire. Inspection of the exterior bead and the other side of the lower sidewall is important in certain tires such as aircraft tires which have three beads, one adjacent the inner surface, one adjacent the exterior surface, and one in between. Failures of the tire materials around the external bead are a frequent source of aircraft tire failure and the inability of conventional, centrally mounted, interferometric analysis equipment to inspect these exterior beads and their adjacent sidewall areas limits the effectiveness of the testing technique.

SUMMARY OF THE INVENTION

The present invention is accordingly directed to an interferometric camera specially designed for use in the inspection of the interior crown and exterior bead areas of vehicle tires as well as other objects having related geometries. Interferometric cameras formed in accordance with the present invention utilize holography, shearography, or other interferometric techniques wherein sections of the object being inspected are illuminated with coherent light and the light reflected from the object must be detected.

A preferred embodiment of the interferometric camera, which will be subsequently disclosed in detail, is designed to perform holography and accordingly includes means for generating an object illuminating beam as well as a reference beam. Light sensitive film is supported in the camera so that it is illuminated by light reflected from the object surface and the reference beam and records their interference pattern.

The camera support is mounted for sliding motion along a horizontal base. Three vertical, aligned, guide members have their lower ends retained in the support and carry a vertically adjustable slide that supports a camera housing. The housing is pivotably supported about a horizontal axis carried by the slide so that the housing may be tilted relative to the slide.

A laser is supported in a fixed position relative to the base and projects its beam horizontally along the axis of motion of the support relative to the base. The beam intersects a mirror which reflects it upward vertically, parallel to the guide memers, to a second mirror which reflects it horizontally along the tilt axis of the camera housing. Accordingly, the beam is directed along the three axis of freedom of the system so that transmission of the beam is unaffected by motion of the support relative to the base, motion of the slide relative to the guide members, or rotation of the camera housing about its pivot axis. A beam splitter supported on the camera housing, at the pivot axis, so as to pivot with the camera housing, divides the incoming coherent beam into a pair of spaced beams, each of which projects along the axis of the camera housing. Accordingly, pivoting of the camera housing about the slide does not affect the projection of these object and reference beams. The object beam is reflected outwardly from the housing by a mirror and passes through a diffuser so as to form a broad beam for illuminating the object surface. The reference beam is passed through a spreading lens and then projected at a film plane. The holographic film is preferably of the roll type so that successive sections may be automatically advanced to form successive holographic exposures.

The camera housing may be supported in a vertical position so that the object beam projects outwardly therefrom in a horizontal direction and the film plane is supported in a vertical direction. In this manner the camera may be used to analyze the interior surfaces of the tire. Alternatively, the housing may be pivoted about the slide so that it makes an angle relative to the vertical and the object illuminating beam is projected generally downwardly so that it may illuminate the outer sidewall of the tire. The film plane is always vertical to the object illuminating beam so that light reflected from the object reaches the film.

The interferometric camera of the present invention may therefore be adjusted to a variety of positions without disrupting the relationship between the coherent light beam and the camera apparatus.

BRIEF DESCRIPTION OF THE DRAWINGS

FIG. 1 is a perspective view of a preferred embodiment taking the form of a holographic camera, with the camera housing disposed parallel to the vertical guide;

FIG. 2 is a perspective view of the camera with the housing supported at an inclined angle relative to the vertical guides;

FIG. 3 is a detailed elevation view of the camera support housing showing an alternative inclined position in phantom lines;

FIG. 4 is a detailed sectional view of a portion of the optical assembly of the present invention;

Figure 5:
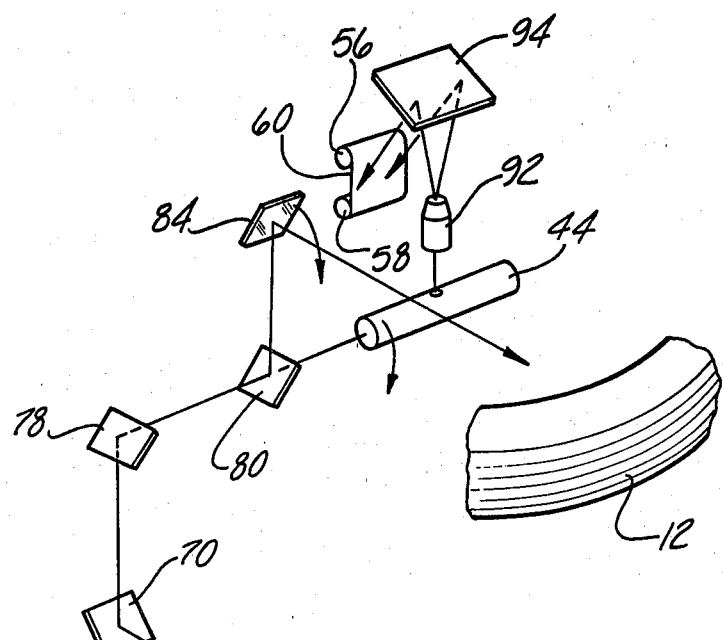
FIG. 5 is a schematic diagram illustrating the optical path when the camera is used to inspect the interior of a tire.
Figure 6:
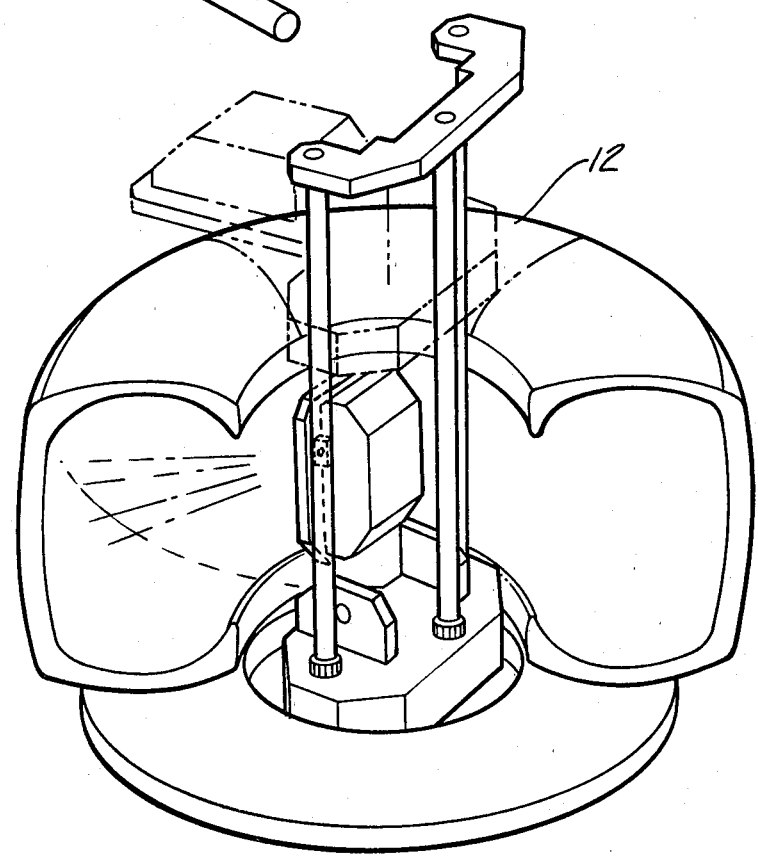
FIG. 6 is a perspective view, broken away, illustrating the relationship of the camera to a tire during holographic inspection.

The preferred embodiment of the interferometric camera, generally indicated at 10, takes the form of a holographic camera specially designed to perform holometric interferometric analysis of a vehicle tire 12 (FIG. 6) employing a double exposure holographic technique. The tire 12 is shown sectioned at FIG. 6 for purposes of illustration. It is supported on an annular disc-shaped horizontal turntable 14 having a central aperture 16. The turntable is supported above a base 18 preferably forming part of a variable pressure chamber. Variations in pressures within the chamber apply a stress to the tire 12 between the two exposures of a double exposure holographic analysis.

As seen in FIGS. 1 and 2, a horizontal way 20 is fixed on the base 18 and a horizontal sliding support member 22 is retained on the way 18 so that its position may be adjusted along the length of the way. The positioning may either be manual or alternatively motor drive means (not shown) may be provided.

Three elongated guide members 24, 26 and 28 have their lower ends fixed within the support 22 and project upwardly therefrom in the vertical direction. The upper ends of the guide rods are joined together in rigid alignment by a brace 30. A slide member 32 carries three friction bushings 34, 36 and 38 which engage the guide bars 24, 26 and 28 respectively, and allow the slide to be vertically positioned along the guides. The slide may be manually positioned along the guides or alternatively driven by motor means (not shown).

A pair of spaced, vertically aligned, trunion plates 40 and 42 project upwardly from the top side of the slide 32. A hollow tube 44 is rotatably mounted in central aligned holes formed in the mounts 40 and 42 and a camera housing, generally indicated at 46, is secured to the tube 44 and thereby pivotably supported with respect to the slide 32.

The camera housing 46 includes a pair of spaced parallel plates 48 and 50 which retain the tube 44 and a back-plate 52 which extends normally between the plates 48 and 50 and upwardly therefrom. A film support assembly 54 is secured to the rear side of the housing plate 52. As illustrated in phantom lines in FIGS. 3, the film assembly 54 incorporates a pair of film reels 56 and 58 which act to position a section of film 60 over a window 62 formed in the support plate 52. A motor 64 (FIG. 2) is connected to the reels 56 and 58 by a chain drive 66 which allows the film to be advanced for successive exposures.

Considering the optical elements of the assembly, a laser 68 is supported on the base 18 and projects a collimated beam horizontally, parallel to the motion of the support 22 along the ways 20. The beam intersects a plane mirror 70 fixed on the support 22 and is reflected upwardly, through 90°, passing through a hole in an alignment plate 72 fixed to the top surface of the support 22. The vertically directed beam passes through a hole 74 formed in the slide 32, as is best seen in FIGS. 3 and 4, and then passes upwardly through a tube 76 supported above the slide 32. A plane mirror 78 is fixed at the top of the tube 76 and reflects the beam horizontally along the central axis of the tube 44. A beam splitter 80 is positioned at one end of the tube 44 and acts to divide the beam into a pair of sections, one of which is projected along back-plate 52 to a diffusing mirror 84 supported on bracket 86 on the back-plate. The diffused beam is projected outward normally to the plate 52. As the housing 46 is pivoted relative to the slide 32 the beam splitter 80 rotates so as to continue to project its beam to the diffusing mirror 84 and accordingly the diffused beam is projected normally to the plate 52 independent of the pivot position of the housing relative to the slide.

The other portion of the beam from the splitter 80 continues along its incident central axis, through the center of the tube 44 to a plane mirror 88 supported centrally within the tube. That mirror projects the beam into a hole 90 in the tube parallel to the beam from the mirror 80. The second beam passes through a spreading lens 92 and the spread beam is reflected by a mirror 94 through the window 62 and onto the film section 60. The film also receives light reflected from an object illuminated by the diffused beam from the mirror 84 and records the interference patterns between the two incident light wavefronts.

In analysis of the tire 12, the camera housing 46 may be supported centrally along guide members 24, 26 and 28, with the plate 52 in the vertical plane, parallel to the guide members. In that position the object illuminating beam reflected from the diffusing mirror 84 projects substantially horizontally and may be used to analyze an interior wall section of the tire 12. In accordance with conventional holographic interferometric practice the laser 68 is briefly energized to form one exposure and then the pressure within the chamber is modified, stressing the tire and a second exposure is made. The film is then advanced and the tire is rotated so that another section of the interior may be analyzed by the camera.

To analyze the bead area on the lower sidewalls of the tire, the slide 32 may be moved to the top of the guides and the plate 52 inclined about the axis formed by the tube 44, to the alternative position shown in FIG. 3 wherein the plate 52 is at approximately a 45° angle. The object illuminating beam then projects downwardly and the camera may view the upper sidewalls of the tire to perform the holographic analysis.

Since motions of the adjustable element of the camera are along the axis of the beam, these motions do not affect transmission of the beam through its required optical path.

We claim:

1. An interferometric camera comprising, in combination:
a base;
a coherent light source fixedly supported relative to the base;
a housing pivotably supported relative to the base about a pivot axis;
a film support mechanism mounted on the housing; and
a series of optical elements positioned to receive a beam of light projected by said coherent light source and to direct the beam along the pivot axis of the housing and thence into said housing, at least certain of the optical elements being supported on the housing for pivotal motion therewith, said series of optical elements being operative to direct at least a portion of the light beam outwardly from said housing to illuminate an object to be analyzed, whereby the housing may be positionally adjusted relative to the base along said pivot axis to interferometrically analyze surfaces having a variety of inclinations relative to the housing.

2. The camera of claim 1 wherein said housing is adjustably supported along a second axis which is perpendicular to the first axis and wherein the series of optical elements include means for directing said beam of coherent light along said second axis.

3. The camera of claim 2 in which at least one of said series of optical elements is supported on the housing to project its beam in a substantially horizontal direction and said second axis is aligned in a substantially vertical direction.

4. The camera of claim 1 in which the camera is adapted to perform a holographic interferometric analysis and in which said series of optical elements include a beam splitter supported on said pivot axis and operative to divide said coherent light beam into an object beam and a reference beam, and elements for projecting both said object and said reference beams normally to the first pivot axis.

5. The camera of claim 4 wherein said series of optical elements include an element supported on the housing at a distance from the first optical axis which is operative to reflect the reference beam to film maintained on said film support.

6. A camera for performing interferometric analysis, comprising:
a planar base;
a coherent light source fixedly supported relative to the base and operative to project a coherent light beam parallel to the base;
a support member moveable on the base along an axis parallel to said coherent light beam;
guide members, each having one end fixed at spaced points to the support member and projecting normally thereto;
a slide adjustably supported on the guide member;
a camera housing pivotably supported on the slide about a pivot axis extending normally to the guide members and to the coherent light beam as it projects from the coherent light source;
a film support retained on the camera housing;
an optical element fixed to the support slide and camera housing operative to receive a beam from the coherent light source, to project the beam parallel to the guide members to the slide, along the pivot axis of the camera housing to the camera housing, and to project the beam from the camera housing so as to illuminate a surface to be analyzed to cause reflected light to impinge upon a photographic film supported on the housing.

7. The camera of claim 6 including a beam splitter supported on the pivot axis of the camera housing to divide the beam from the coherent light source into an object beam to be projected outwardly from the housing to illuminate the surface to be analyzed, and into a reference beam operative to be directed to the film.

8. The camera of claim 6 including a rolled supply of film and motor means for advancing the film.

* * * * *